(12) United States Patent
Pez et al.

(10) Patent No.: US 7,429,373 B2
(45) Date of Patent: Sep. 30, 2008

(54) PROCESS FOR AUTOTHERMAL GENERATION OF HYDROGEN

(75) Inventors: Guido Peter Pez, Allentown, PA (US);
Robert Quinn, Macungie, PA (US);
Shankar Nataraj, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 585 days.

(21) Appl. No.: 11/165,731

(22) Filed: Jun. 24, 2005

(65) Prior Publication Data
US 2006/0292069 A1    Dec. 28, 2006

(51) Int. Cl.
*C01B 3/26*    (2006.01)

(52) U.S. Cl. .................. 423/652; 423/653; 423/654

(58) Field of Classification Search .............. 423/652, 423/653, 654
See application file for complete search history.

(56) References Cited

U.S. PATENT DOCUMENTS

| | | | |
|---|---|---|---|
| 4,578,089 A | 3/1986 | Richter et al. | |
| 5,055,441 A | 10/1991 | McCarron, III et al. | |
| 5,827,496 A | 10/1998 | Lyon | |
| 6,007,699 A | 12/1999 | Cole | |
| 6,238,816 B1 * | 5/2001 | Cable et al. | 429/17 |
| 6,322,766 B1 | 11/2001 | Schicketanz et al. | |
| 6,506,510 B1 | 1/2003 | Sioui et al. | |
| 6,682,838 B2 | 1/2004 | Stevens | |
| 6,761,838 B2 | 7/2004 | Zeng et al. | |
| 6,767,530 B2 | 7/2004 | Kobayashi et al. | |
| 6,974,566 B2 | 12/2005 | Sabacky et al. | |
| 7,070,752 B2 * | 7/2006 | Zeng et al. | 423/418.2 |
| 2002/0010220 A1 | 1/2002 | Zeng et al. | |
| 2002/0071806 A1 | 6/2002 | Sabacky et al. | |
| 2003/0035770 A1 | 2/2003 | Cole | |

(Continued)

FOREIGN PATENT DOCUMENTS

EP    0 411 506 A2    2/1991

(Continued)

OTHER PUBLICATIONS

Nakahara, et al., "Synthesis and crystal structure of (SR1-xCax)2 FeMnOy (x=0-1.0)," Elsevier Science B.V. Materials Letters, 30, (Feb. 1997) pp. 163-167.

(Continued)

*Primary Examiner*—Wayne Langel
(74) *Attorney, Agent, or Firm*—Keith D. Gourley; Bryan C. Hoke, Jr.

(57) ABSTRACT

Process for producing hydrogen comprising reacting at least one hydrocarbon and steam in the presence of a complex metal oxide and a steam-hydrocarbon reforming catalyst in a production step under reaction conditions sufficient to form hydrogen gas and a spent complex metal oxide, wherein the complex metal oxide is represented by the formula $$A_x B_y O_n$$

wherein A represents at least one metallic element having an oxidation state ranging from +1 to +3, inclusive, wherein the metallic element is capable of forming a metal carbonate; x is a number from 1 to 10, inclusive; B represents at least one metallic element having an oxidation state ranging from +1 to +7, inclusive; y is a number from 1 to 10, inclusive; and n represents a value such that the complex metal oxide is rendered electrically neutral.

25 Claims, 4 Drawing Sheets

U.S. PATENT DOCUMENTS

| | | | |
|---|---|---|---|
| 2003/0150163 | A1 | 8/2003 | Murata et al. |
| 2003/0229151 | A1 | 12/2003 | Hurlburt et al. |
| 2004/0191166 | A1 | 9/2004 | Hershkowitz et al. |
| 2005/0112056 | A1 | 5/2005 | Hampden-Smith et al. |
| 2006/0292066 | A1 | 12/2006 | Pez et al. |

FOREIGN PATENT DOCUMENTS

| | | |
|---|---|---|
| EP | 0 737 648 B1 | 8/2000 |
| EP | 1 134 187 A2 | 11/2001 |
| EP | 1 736 438 A2 | 12/2006 |
| WO | 99/02471 A1 | 1/1999 |

OTHER PUBLICATIONS

Z. C. Zang, et al., "Hydrogen Production from Methane and Water by Lattice Oxygen Transfer with Ce0.70Zr0.25Tb0.05O2-x", J. Alloys and Compounds, 323-324 (2001), pp. 97-101.

K. Vidyasagar, et al., "A Convenient Route for the Synthesis of Complex Metal Oxides Employing Solid-Solution Precursors", Inorg. Chem., 1984 (23), 1206-1210.

A. R. Brun-Tsekhovoi, et al., "The Process of Catalytic Steam-Reforming of Hydrocarbons in the Presence of Carbon Dioxide Acceptor", Hydrogen Energy Progres VII, Proceedings of the 7$^{th}$ World Hydrogen Eenrgy Conference, Moscow (vol. 2, 1988), pp. 885-900.

B. Balasubramanian, "Hydrogen from Methane in a Single-Step Process", Chem. Eng. Sci. 54 (1999), 33543-3552.

Y. Ding, "Adsorption-Enchanced Steam Methane Reforming", Chem. Eng. Sci. 55 (2000), pp. 3929-3940.

Hufton, J., et al; "Sorption Enhanced Reaction Process (SERP) for the Production of Hydrogen"; Proceedings of the 2000 Hydrogen Program Review NREL/CP-570-28890; pp. 1-14.

Waldron, W.E., et al; "Parametric Study of a Pressuring Swing Adsorption Process"; Adsorption; vol. 6; 2000; pp. 179-188; XP-002464014.

Heungsoo, S.; "Separation of a Binary Gas Mixture by Pressure Swing Adsorption: Comparison of Different PSA Cycles"; Adsorption; vol. 1; 1995; pp. 321-333; XP-002464015.

Aihara, M., et al; "Development of Porous Solid Reactant for Thermal-Energy Storage and Temperature Upgrade using Carbonation/Decarbonation Reaction"; Applied Energy, Elsevier Science Ltd; 2001; pp. 225-238.

* cited by examiner

PROCESS FOR AUTOTHERMAL GENERATION OF HYDROGEN

BACKGROUND OF THE INVENTION

The production of industrial-scale volumes of hydrogen is typically accomplished by application of the steam-methane reforming process, which entails the catalytic reforming of natural gas with steam at elevated temperatures (800-900° C.). This process yields a crude synthesis gas, which is a mixture of hydrogen, carbon monoxide, and carbon dioxide, and the crude synthesis gas is further reacted in a catalytic water-gas shift conversion step to convert carbon monoxide and water to additional hydrogen and carbon dioxide. The shifted synthesis gas is purified to yield a final hydrogen product containing greater than 99 vol % hydrogen.

The natural gas reforming reaction is highly endothermic, requiring about 45 kcal/mole of methane, and the productivity of the steam-methane reforming process is limited by the rate of heat transfer from the external heat source to the catalyst. The catalyst typically is contained in long metal alloy tubes, and the alloy is selected to withstand the elevated temperatures and pressures required by the process. A significant part of the capital cost of the steam-methane reforming process equipment is related to the need for significant heat transfer at the high operating temperatures and pressures.

An alternative process for the production of hydrogen is the partial oxidation of methane to form synthesis gas, which is subsequently shifted if necessary and purified by pressure swing adsorption (PSA). Partial oxidation is known to be highly exothermic. Another alternative process to generate synthesis gas for hydrogen production is autothermal reforming, which is essentially a thermally balanced combination of the steam-methane reforming process and partial oxidation. One considerable drawback associated with these alternative processes is that partial oxidation requires a supply of high purity oxygen gas to the reaction system. Therefore, the use of these processes requires the additional step of separating air to produce the oxygen gas, and the air separation process increases the capital and operating costs of hydrogen production.

Numerous methods for the production of hydrogen gas are known in the art. One method entails the reaction of metal oxides with steam and methane. United States Patent Application Publication No. 2002/0010220 describes the production of hydrogen and carbon monoxide by the partial oxidation and/or steam reforming of hydrocarbons in an autothermal process. The publication further discloses the use of an oxygen ion conducting, particulate ceramic in a cyclic process which involves the reaction of oxygen in the air feed with the ceramic in one step, and the reaction of hydrocarbon feed and, optionally, steam, with the oxygen-enriched ceramic produced in the first step, to produce hydrogen and carbon monoxide. Preferred ceramic materials are stated to include perovskite substances.

Similarly, the reaction of steam-methane using fluorite oxides is disclosed in "Hydrogen Production from Methane and Water by Lattice Oxygen Transfer with $Ce_{0.70}Zr_{0.25}Tb_{0.05}O_{2-x}$," Z. C. Kang et al., J. Alloys and Compounds, 323-324 (2001) 97-101. Neither reference discloses the retention of carbon dioxide by the oxides to remove it from the hydrogen and carbon monoxide reaction products.

Investigations of the catalytic steam-methane reforming reaction have been carried out in systems which contain carbon dioxide acceptors to yield a higher-purity hydrogen rich product. For example, the use of calcium oxide, a carbon dioxide acceptor which is converted to calcium carbonate by chemisorption of the carbon dioxide, is disclosed in "The Process of Catalytic Steam-Reforming of Hydrocarbons in the Presence of Carbon Dioxide Acceptor," A. R. Brun-Tsekhovoi et al., Hydrogen Energy Progress VII, Proceedings of the 7th World Hydrogen Energy Conference, Moscow, Vol. 2, pp. 885-900 (1988). The use of calcium oxide as a carbon dioxide acceptor in the steam-methane reforming reaction is also disclosed in "Hydrogen from Methane in a Single-Step Process," B. Balasubramanian et al., Chem. Eng. Sci. 54 (1999), 3543-3552. Hydrotalcite-based carbon dioxide adsorbents are disclosed in "Adsorption-enhanced Steam-Methane Reforming," Y. Ding et al., Chem. Eng. Sci. 55 (2000), 3929-3940.

U.S. Pat. No. 5,827,496 discloses a process for carrying out an endothermic reaction, such as the reforming petroleum hydrocarbons, within a packed bed reactor using an unmixed combustion catalytic material and a heat receiver. The catalytic materials are referred to as "mass-transfer catalysts," and include metal/metal oxide combinations such as nickel/nickel oxide, silver/silver oxide, copper/copper oxide, cobalt/cobalt oxide, tungsten/tungsten oxide, manganese/manganese oxide, molybdenum/molybdenum oxide, strontium sulfide/strontium sulfate, barium sulfide/barium sulfate, and mixtures thereof. The heat receiver may also include a $CO_2$ sorbent material, which is essentially limited to calcium oxide or a source thereof. This patent, in the context of its disclosed general process for heat transfer by "unmixed combustion," describes a process for reforming petroleum hydrocarbons with steam.

U.S. Pat. No. 6,007,699 also discloses an "unmixed combustion" method that utilizes a combination of physical mixtures of metal oxides, a heat receiver and a catalyst comprising one or more metal/metal oxide combinations. Calcium oxide is used to remove carbon dioxide and drive the equilibrium reaction towards the production of hydrogen.

U.S. Pat. No. 6,682,838 discloses a method for converting hydrocarbon fuel to hydrogen-rich gas by reacting the hydrocarbon feed with steam in the presence of a reforming catalyst and a carbon dioxide fixing material, removing carbon monoxide from the hydrogen gas product by methanation or selective oxidation, and regenerating the carbon dioxide fixing material by heating it to at least 600° C. Suitable disclosed carbon dioxide fixing materials include calcium oxide, calcium hydroxide, strontium oxide, strontium hydroxide, and other mineral compounds containing Group II elements.

Known processes for the generation of hydrogen gas from hydrocarbons thus have associated drawbacks and limitations due to the highly endothermic nature of the hydrocarbon steam reforming reactions and the requirement of an oxygen supply for the partial oxidation of hydrocarbons used in autothermal reforming. There is a need in the field of hydrogen generation for improved process technology for the generation of hydrogen gas by the reaction of methane or other hydrocarbons with steam without certain of the limitations associated with known processes. This need is addressed by the embodiments of the present invention described below and defined by the claims that follow.

BRIEF SUMMARY OF THE INVENTION

An embodiment of the invention relates to a process for producing hydrogen comprising reacting at least one hydrocarbon and steam in the presence of a complex metal oxide and a steam-hydrocarbon reforming catalyst in a production step under reaction conditions sufficient to form hydrogen gas and a spent complex metal oxide, wherein the complex metal oxide is represented by the formula $$A_xB_yO_n$$

wherein A represents at least one metallic element having an oxidation state ranging from +1 to +3, inclusive, wherein the metallic element is capable of forming a metal carbonate; x is a number from 1 to 10, inclusive; B represents at least one metallic element having an oxidation state ranging from +1 to +7, inclusive; y is a number from 1 to 10, inclusive; and n represents a value such that the complex metal oxide is rendered electrically neutral.

This embodiment may further comprise reacting the spent mixed metal oxide and an oxygen source gas in a regeneration step under reaction conditions sufficient to regenerate the complex mixed metal oxide. A in the complex metal oxide may represent at least one metallic element selected from the group consisting of elements of Groups 1, 2, and 3, and the Lanthanide elements of the IUPAC Periodic Table of the Elements; and B represents at least one metallic element selected from the group consisting of elements of Groups 4 to 15 of the IUPAC Periodic Table of the Elements. B in the complex metal oxide may be selected from the group consisting of vanadium, chromium manganese, iron, cobalt, copper, nickel, and mixtures thereof.

The production step may be characterized by a production temperature in the range of 350° C. to 900° C. and a production pressure ranging from 1 to 100 atmospheres. The molar ratio of steam to the at least one hydrocarbon may range from 1:1 to 20:1. The molar ratio of steam to the at least one hydrocarbon in the feed gas during the production step may be less than 150% of the theoretical amount.

The oxygen source may be selected from the group consisting of air, oxygen, oxygen-depleted air and mixtures thereof. The process of claim 2 wherein the regeneration step is characterized by a regeneration temperature in the range of 450° C. to 900° C. The production step may be characterized by a production temperature and the regeneration step may be characterized by a regeneration temperature, wherein the regeneration temperature may be greater than the production temperature and wherein the difference between the regeneration temperature and the production temperature may be 100° C. or less.

The steam-hydrocarbon reforming catalyst may contain one or more components selected from the group consisting of nickel, cobalt, ruthenium, osmium, rhodium, palladium, platinum, iridium, oxides of the foregoing metals, and a catalyst support. The at least one hydrocarbon may be selected from aliphatic hydrocarbons having from 1 to 20 carbon atoms. The at least one hydrocarbon may be methane obtained as a component of natural gas. The molar ratio of steam to methane may range from 1.3:1 to 4:1, inclusive. Alternatively, the at least one hydrocarbon may be provided by pre-reformed natural gas.

The yield of hydrogen produced per mole of the at least one hydrocarbon consumed may be within ±10% of the maximum yield of hydrogen that can be realized at thermoneutral conditions. The regeneration step may be carried out at a pressure lower than the pressure of the production step.

Another embodiment of the invention relates to a process for producing hydrogen comprising (a) providing a reactor containing a complex metal oxide and a steam-hydrocarbon reforming catalyst, wherein the complex metal oxide is represented by the formula:

$$A_xB_yO_n$$

wherein A represents at least one metallic element having an oxidation state ranging from +1 to +3, inclusive, wherein such metallic element is capable of forming a metal carbonate; x is a number from 1 to 10, inclusive; B represents at least one metallic element having an oxidation state ranging from +1 to +7, inclusive; y is a number from 1 to 10; inclusive and n represents a value such that the complex metal oxide is rendered electrically neutral;

(b) introducing a feed gas containing least one hydrocarbon and steam into the reactor in a production step, reacting the at least one hydrocarbon and the steam in the presence of the complex metal oxide and the steam-hydrocarbon reforming catalyst under reaction conditions sufficient to form hydrogen and a spent complex metal oxide, and withdrawing from the reactor a product gas comprising hydrogen;

(c) terminating the introduction of the at least one hydrocarbon and optionally purging the reactor with a purge gas to displace combustible components from the reactor and withdrawing a purge gas effluent therefrom;

(d) regenerating the reactor in a regeneration step by reacting the spent mixed metal oxide and an oxygen source gas under reaction conditions sufficient to regenerate the complex mixed metal oxide;

(e) optionally purging the reactor with a purge gas;

(f) pressurizing the reactor by introducing a pressurizing gas into the reactor at pressure; and (g) repeating (b) through (f) in a cyclic manner.

The pressurizing gas may be obtained from the group consisting of hot reactor feed, hot reactor effluent, steam, feed to a pressure swing adsorption system, and product gas. The process may further comprise, prior to purging the reactor in (c), depressurizing the reactor by withdrawing a depressurization gas therefrom. The feed gas may contain up to 25 vol % hydrogen. The feed gas may be pre-reformed natural gas. The process may further comprise cooling the product gas and removing non-hydrogen components therefrom in a pressure swing adsorption process to yield a high-purity hydrogen product comprising at least 99 vol % hydrogen.

The process may further comprise providing at least one additional reactor containing the complex metal oxide and the steam-hydrocarbon reforming catalyst, and operating the at least one additional reactor by carrying out steps (b) through (f) such that each of the reactors proceeds through the production step (b) during a different time period. A portion of the product gas from the production step may be retained and introduced into the reactor with the feed gas in a succeeding production step.

The purge gas may be selected from the group consisting of steam, nitrogen, or a mixture thereof. Elemental carbon may be deposited during the production step and may be oxidized and removed from the reactor in the regeneration step.

The feed gas may comprise methane and the yield of hydrogen produced per mole of methane consumed may be within ±10% of the maximum yield of hydrogen that can be realized at thermoneutral conditions. The yield of hydrogen produced per mole of methane consumed may be within ±5% of the maximum yield of hydrogen that can be realized at thermoneutral conditions.

DETAILED DESCRIPTION OF THE INVENTION

Embodiments of the present invention relate to a process for generating hydrogen by the reaction of one or more gaseous hydrocarbons with gaseous water, i.e., steam. In an embodiment of the invention, a process for generating hydrogen gas comprises the steps of (a) reacting one or more hydrocarbons with water in the presence of a complex metal oxide and a steam-hydrocarbon reforming catalyst to form hydrogen and a spent complex metal oxide; and (b) regenerating the spent complex metal oxide by reacting the spent complex metal oxide with air. The hydrocarbon may be methane and the steam-hydrocarbon reforming catalyst may be a steam-methane reforming catalyst. The term "complex metal oxide" is defined herein as a chemical compound comprising oxygen and two or more elements that are regarded as metals in their pure unoxidized state at normal ambient conditions. Complex metal oxides may include, for example, ternary or quarternary metal oxides comprising two and three metallic elements, respectively, in combination with oxygen. In contrast to a complex metal oxide, a simple metal oxide is a combination of only one element and oxygen and is usually referred to as a binary oxide. This distinction between complex and simple oxides is further explained with specific illustrations in *Comprehensive Inorganic Chemistry*, Vol. 2, pp. 729-735, Pergamon Press (1975).

In one embodiment of the present invention, an autothermal process is used for producing hydrogen directly in a single reaction zone or reactor bed by the reaction of one or more hydrocarbons with steam. The one or more hydrocarbons may comprise methane.

The term "autothermal process" is used herein to describe a process comprising a plurality of chemical reactions, at least one of which is exothermic and at least one of which is endothermic, wherein some or all of the energy requirements of the endothermic reaction or reactions are supplied by the exothermic reaction or reactions. Thus, once the chemical reactions of the process have been initiated, minimal additional energy input is required to sustain the reactions, and the process is essentially thermally self-sustaining. In a first or reaction step of the process, the endothermic heat required for the catalytic reaction of one or more hydrocarbons with water is provided by the exothermic heat of partial oxidation of the one or more hydrocarbons with oxygen being derived from the complex metal oxide and by the usually exothermic reaction of carbon dioxide with the complex metal oxide. In a second or regeneration step of the process, the regeneration of the complex metal oxide is effected by the reaction of oxygen with the spent complex metal oxide and the liberation of carbon dioxide taken up by the complex metal oxide in the first step, and this regeneration step also is an autothermal process.

The indefinite articles "a" and "an" as used herein mean one or more when applied to any feature in embodiments of the present invention described in the specification and claims. The use of "a" and "an" does not limit the meaning to a single feature unless such a limit is specifically stated. The definite article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

In practice, it may be desirable to carry out the synthesis and regeneration steps under conditions that are slightly net exothermic to compensate for any losses of heat during the process. Such heat losses may result in small temperature changes as determined by the respective enthalpies of the reaction steps and the heat capacities of the reactor beds. However, the closer the overall process approaches a thermoneutral process, the greater the yield of hydrogen and the more energy efficient the production of the hydrogen product.

Thus in the first (step (a)) of the process described herein the endothermic reaction of one or more hydrocarbons with steam is balanced by the exothermic partial oxidation of the one or more hydrocarbons and the usually exothermic reaction of carbon dioxide with the mixed metal oxide. At steady-state conditions, the desirable autothermal process does not require that heat energy be supplied to the reactors to sustain the reaction after startup. However, during startup, an initial quantity of imported heat energy may be required for the generation of steam for the reaction. This heat energy may be supplied by any suitable method such as, for example, the use of a reaction exotherm or combustion of a fuel material. The autothermal, and desirably slightly exothermic, process provides for a highly efficient generation of hydrogen from hydrocarbons and steam. In addition, the process described herein reduces the need for high heat transfer surface area and special alloys that are required in conventional steam-hydrocarbon reforming reactor systems, and thus may lead to simpler and less costly reformer reactors.

The embodiments of the present invention utilize a cyclic two-step reaction. In the first step of the process (step (a)), defined equivalently as the reaction, synthesis, or production step, water and one or more hydrocarbons are introduced into a reactor. Suitable reactors may be packed bed catalytic reactors, fluidized bed reactors, or any other reactor configuration. Any hydrocarbons may be used which are capable of catalyzed reaction with steam to form hydrogen. The hydrocarbons may be selected from aliphatic hydrocarbons having from 1 to about 20 carbon atoms, and advantageously are selected from aliphatic hydrocarbons having from 1 to about 6 carbon atoms. Desirably, the hydrocarbon feed may be selected from methane, natural gas, propane, or a mixture of predominantly $C_1$ to $C_4$ aliphatic hydrocarbons. The process is effected by passing a gaseous feed mixture containing steam and one or more hydrocarbons through a reaction bed which comprises a complex metal oxide material and a conventional steam-hydrocarbon reforming process catalyst, the reaction bed being maintained at an elevated temperature.

A desirable gaseous feed mixture comprises steam and methane. The methane in the steam/methane gaseous mixture may be obtained from any suitable source, and may be, for example, natural gas from which sulfur compounds have been removed. It is advantageous to include a low level of hydrogen, e.g. ~3 mole % as a product recycle to the feed stream in order to assist in the reduction/activation of the catalyst and possibly to reduce the likelihood of carbon deposition, particularly where unreformed natural gas or $C_2$ and higher hydrocarbons are present in the feed.

The molar ratio of steam to hydrocarbon typically ranges from about 1:1 to about 20:1 The minimum or theoretical steam to hydrocarbon ratio depends on the composition of the hydrocarbon and can be estimated by the method described in the following section. In one embodiment, the hydrocarbon is propane, and the molar ratio of steam to propane may be from about 4:1 to about 10:1. In another embodiment, the hydrocarbon is methane; the molar ratio of steam to methane may be between about 1.3:1 and about 4:1, and more specifically this ratio may be between about 1.3:1 and about 2:1.

In another embodiment, the gaseous feed mixture may be a mixture of adiabatically pre-reformed natural gas and steam. The adiabatic pre-reforming process is effected by heating natural gas to a temperature of about 500° C. and passing the heated gas through an adiabatic nickel catalyst bed. Natural gas typically contains about 5% of heavy hydrocarbon fractions, wherein the term "heavy" is understood to mean fractions containing two or more carbon atoms. The heavy fractions are typically more reactive than methane, and catalytically reform to yield carbon dioxide and hydrogen. The resulting gas mixture therefore contains a mixture of methane, carbon dioxide, steam, and hydrogen. The pre-reforming reactions typically are endothermic, and because the reaction usually proceeds adiabatically, the temperature of the resulting gas mixture decreases. Typically, the temperature of the gas mixture is reduced to about 450° C. after pre-reforming.

The use of pre-reformed natural gas instead of untreated natural gas has associated advantages. First, the pre-reforming process generates some hydrogen, which is useful for chemically reducing to an active state the catalyst of the subsequent steam-methane reforming reaction. Second, the removal of the heavy hydrocarbon fractions reduces the potential for carbon deposition on the steam-methane reforming catalyst. The use of pre-reforming extends the life of the catalyst, since carbon deposition ultimately leads to the deactivation of the catalyst.

The complex metal oxide material and a conventional steam-hydrocarbon reforming process catalyst may be combined prior to loading in the reaction bed. Combining the complex metal oxide and the steam-hydrocarbon reforming catalyst may be effected in any suitable manner, for example, by mixing the steam-hydrocarbon reforming catalyst with the complex metal oxide material or impregnating the complex metal oxide material with the steam-hydrocarbon reforming catalyst. Alternatively or additionally, the complex metal oxide itself may promote steam-hydrocarbon reforming when component B (see below) of the oxide is reduced to its metallic or zero oxidation state during the hydrogen synthesis reaction. Examples of component B include cobalt and nickel that exist in a positive oxidation state as part of the structure of the complex metal oxide and may be reduced at reaction conditions to metallic cobalt and metallic nickel, in which form they may be active as steam-hydrocarbon reforming catalysts. In this case, the complex metal oxide functions as a precursor to the steam-hydrocarbon reforming catalyst, as an oxygen source, and as a carbon dioxide acceptor. The steam-hydrocarbon reforming catalyst may be physically mixed with the complex metal oxide material as described above. Typically, the reaction bed is maintained at an elevated temperature, and the reforming reactions may be effected in the range of about 350° C. to about 900° C. and more specifically in the range of about 600° C. to about 750° C.

Suitable complex metal oxide materials for use in the embodiments of the present invention include oxides comprising two or more metallic elements with the general formula $$A_xB_yO_n$$

wherein A is at least one metallic element having an oxidation state ranging from +1 to +3, inclusive, wherein the metallic element is capable of forming a metal carbonate; x is a number from 1 to 10, inclusive; B is at least one metallic element having an oxidation state ranging from +1 to +7 inclusive, wherein B can be the same element in at least two different oxidation states; y is a number from 1 to 10 inclusive; and n represents a value such that the complex metal oxide is rendered electrically neutral. The carbonate of the metallic element A may be formed by reaction of an oxide of the element with carbon dioxide wherein the oxide of the element may be formed by reaction of the element with oxygen of water.

In one embodiment, the complex metal oxide material of formula $A_xB_yO_n$ is a composition wherein A is at least one metallic element selected from the group consisting of elements of Groups 1, 2 and 3, and the Lanthanide elements of the IUPAC Periodic Table of the Elements, and B is at least one metallic element selected from the group consisting of elements of Groups 4 to 15 of the IUPAC Periodic Table of the Elements. For example, B may be selected from the group consisting of vanadium, chromium, manganese, iron, cobalt, copper, nickel, and mixtures thereof. Component B may comprise one or more metallic elements, each of which can form oxides having at least two different valencies. The metallic element may be selected from the group consisting of vanadium, manganese, iron, cobalt, nickel, and copper. During the hydrogen gas production step, at least one of the metallic species of component B may be reduced to the metallic zero valence state. Metallic species of component B which may be reduced to the metallic state during the hydrogen production step include, but are not limited to, iron, cobalt, nickel, and copper Suitable conventional steam-hydrocarbon reforming process catalysts include any materials effective for the reforming of methane or higher hydrocarbons with steam to produce hydrogen. These materials may include, for example, any of nickel, cobalt, the platinum group metals (i.e., ruthenium, osmium, rhodium, palladium, platinum, and iridium), and oxides of the foregoing metals. The materials may be supported on zirconia, alumina, or other suitable supports. If the steam-hydrocarbon reforming catalyst is a supported nickel or cobalt oxide material, it may be necessary to at least partially reduce the oxide to the metal with a feed of methane containing at least about 3% hydrogen prior to initiating the reforming reaction step. This hydrogen may be obtained by recycling a small portion of the product $H_2$ to the feed stream. The nickel/nickel oxide catalyst when functioning as a redox system may have a significant influence on the overall thermochemistry of the process as demonstrated below.

In the first step of the process, nickel oxide is reduced to nickel metal:

$$H_2+NiO \rightarrow Ni+H_2O \ \Delta H=-3.01 \ \text{kcal/mole at } 700° \text{C.}$$

while in the second step of the process the oxide is reformed:

$$Ni+\tfrac{1}{2}O_2 \rightarrow NiO \ \Delta H=-56.2 \ \text{kcal/mole}$$

Thus, a measured addition of nickel may be used to bring about a desired thermochemistry for the reaction. For example, the addition of nickel can be used to alter the thermochemistry of the complex metal oxide regeneration reaction from endothermic to exothermic. The addition of 0.1 atom Ni/2CaCO$_3$ in the system of Example 4 decreases ΔH for the net reaction from 5.01 kcal/2CaCO$_3$ to −0.61 kcal/2CaCO$_3$, thereby making it slightly exothermic.

Without being bound by theory, it is believed that when the platinum group metals are used as catalysts, the bulk metallic states are usually retained through both steps in the process, i.e., the reaction and regeneration steps, but depending on the temperature of the process may be accompanied by the formation of intermediate surface oxide species in amounts that do not significantly effect the thermodynamics of the process.

During the first step of the process (step (a)), the gaseous reactants, i.e., steam and one or more hydrocarbons, are fed through a reaction bed which comprises a complex metal oxide material and a conventional steam-hydrocarbon reforming process catalyst, the reaction vessel bed being maintained at an elevated temperature. A product of relatively pure hydrogen, i.e., greater than about 90% pure, is obtained until the complex metal oxide material becomes depleted.

It is believed that water in the form of steam and the one or more hydrocarbons react in the presence of the catalyst to yield hydrogen and by-product carbon dioxide. The reaction is highly endothermic. For example, in the steam-methane reforming reaction, as described in equation 1, steam reacts with methane in the presence of a catalyst to yield carbon dioxide and hydrogen, and the calculated enthalpy change (ΔH) for the reaction is +45.6 kcal/mole at 700° C.:

$$CH_4 + 2H_2O \xrightarrow{catalyst} CO_2 + 4H_2 \quad (1)$$

The incorporation of the complex metal oxide in this steam-methane reforming reaction system provides both a source of oxygen, as described in Equation 2, and a means of capturing the carbon dioxide produced as a by-product of the steam-methane reforming reaction, as described in Equation 3. In one embodiment, the complex metal oxide may be represented as $A_xB_yO_n$, wherein both x and y are 1 and A and B each represent a single element, and this form is used in Equations 2 to 7 below to illustrate the underlying chemistry of the process.

The incorporation of the complex metal oxide provides an oxidant species which delivers oxygen to the process, and additionally provides the benefit of removing carbon dioxide from the hydrogen gas product stream according to the reactions:

$$ABO_n = ABO_{n-x} + x/2 O_2 \quad (2)$$

$$ABO_{n-x} + CO_2 = ACO_3 + BO_{n-x-1} \quad (3)$$

Alternatively, the reaction of the reduced (partially oxygen depleted) complex metal oxide with CO$_2$ (reaction 3) may be viewed as occurring by a dissociation of the complex metal oxide, described in Equation 4a, followed by reaction of the AO binary oxide with CO$_2$ described in Equation 4b.

$$ABO_{n-x} = AO + BO_{n-x-1} \quad (4a)$$

$$AO + CO_2 = ACO_3 \quad (4b)$$

Equations 2 and 3 above (where Equation 3 is the combination of Equations 4a and 4b) may be combined to give:

$$ABO_n + CO_2 = ACO_3 + BO_{n-x-1} + x/2 O_2 \quad (4)$$

Without being bound by theory, it is believed that the reaction of Equation 2 proceeds generally as an endothermic process. However, it is also believed that any oxygen or equivalent oxidant produced will react with methane in an exothermic reaction. For example, in the reaction of methane with oxygen, as described in equation 5, methane and oxygen react to yield carbon dioxide and water, and the calculated enthalpy change (ΔH) for the reaction is −191.4 kcal/mole at 700° C.:

$$CH_4 + 2O_2 = CO_2 + 2H_2O \quad (5)$$

An ideal, thermoneutral reaction for the preparation of hydrogen from the reaction of methane with steam and oxygen at 700° C. can be generated by combining Equations 1 and 5, each equation is scaled by its respective enthalpy change. The resulting equation, having a calculated enthalpy change (ΔH) of 0 kcal/mole at 700° C. is described in Equation 6:

$$CH_4 + 0.384 O_2 + 1.23 H_2O = CO_2 + 3.23 H_2 \quad (6)$$

In the embodiments of the present invention, the oxygen used in the reaction is generated by the dissociation of the complex metal oxide, as described in Equation 2, while the capture of carbon dioxide by-product is described by Equation 3. A complete theoretical description of the present process, whereby hydrogen is produced from the reaction of methane with steam and oxygen by use of a complex metal oxide at 700° C., may be formulated by combining Equations 2 and 3 (where now at these specific conditions x/2=0.384) with Equation 6 to form Equation 7:

$$CH_4 + ABO_n + 1.23 H_2O = ACO_3 + BO_{n-0.77-1} + 3.23 H_2 \quad (7)$$

As discussed above, component B of the complex metal oxide comprises one or more metallic elements, each of which can form oxides having at least two possible oxidation states. In one embodiment of the present invention, during the hydrogen gas production step, at least one of the metallic species of component B may be reduced to the metallic zero oxidation state. In this embodiment, the subscript (n−0.77−1) is equal to zero, and therefore n is equal to 1.77. The theoretical amount of hydrogen produced per mole of methane is defined as 3.23 according to Equation 7, and this equation therefore defines the term "thermoneutral" as used herein when methane is the hydrocarbon reactant.

Equations analogous to Equation 7 may be obtained for any suitable hydrocarbon by balancing the enthalpy change of the reaction of the hydrocarbon with steam to give hydrogen and carbon dioxide and the enthalpy change of the reaction of the hydrocarbon with oxygen to yield carbon dioxide and water. Equations analogous to Equation 7 then would define the term "thermoneutral" for those reactants.

As discussed above, Equation 7 describes the process for an embodiment of the present invention for the production of hydrogen gas from a steam and methane feed. In this case, the by-product carbon dioxide is totally retained as the ACO$_3$ metal carbonate. Equation 7 describes that at 700° C. the maximum theoretical yield of hydrogen gas will be 3.23 moles of hydrogen per mole of methane used in the reaction.

The maximum yield of hydrogen gas is realized when the complex metal oxide is chosen in order to make the chemistry of Equation 7 an autothermal and thermoneutral reaction, i.e. where ΔH=0. The total enthalpy change of the hydrogen production process chemistry of Equation 7 can be calculated from the enthalpy changes of its component processes when these are known (Equations 1 to 6). While the enthalpy changes for the hydrocarbon-steam reforming and hydrocarbon oxidation reactions Equations 1 and 5 are available from literature sources for a range of temperatures, those for Equations 2 and 3 will be a function of the chosen complex metal oxide, as illustrated in Example 7. Thus an ideal complex metal oxide will permit an overall thermoneutral hydrogen synthesis process (i.e., the chemistry of Equation 7) yielding the theoretical maximum 3.23 moles of hydrogen per mole of methane. If the process is exothermic for a particular complex metal oxide, i.e., if $\Delta H$ is positive, the yield of hydrogen will be less than 3.23 moles of hydrogen per mole of methane. If the process is endothermic, a yield greater than 3.23 moles of hydrogen per mole of methane fed to the reactor, may be realized; but in this situation, external input of heat will be required. If the external input of heat is realized by additional combustion of the same hydrocarbon feedstock, the overall yield of $H_2$ per mole overall $CH_4$ feed can still not exceed the theoretical amount of 3.23. Besides, it is the intention of this invention to preferably conduct these reactions in adiabatic reactors since providing heat externally at these reaction conditions involves extra equipment and expensive alloys.

Thus the easily measurable ratio of moles of hydrogen produced per mole of methane consumed provides via Equation 7 an indication of the approach of the $H_2$ generating process towards thermoneutrality. From Equation 6, which considers only the methane consumed in the process and the hydrogen generated in the process, this ratio is 3.23:1; this is the maximum theoretical yield of hydrogen that is possible at thermoneutral conditions. This ratio also is the yield of hydrogen as given by Equation 7 when $ABO_n$ is the ideal metal oxide composition, i.e., the composition that permits the process of Equation 7 to be thermoneutral. If the mixed metal oxide provides more oxygen than is required for thermoneutrality, there will be a greater component of exothermic oxidation in Equation 1 and thus a lower yield of hydrogen. On the other hand, if the complex metal oxide provides insufficient oxygen for thermoneutrality, the yield of hydrogen may be greater than 3.23:1, and may even range up to 4:1, if there is sufficient steam available in the feed and sufficient heat stored in the bed.

At these two extremes, i.e., excess oxygen available from the complex metal oxide or insufficient oxygen available from the complex metal oxide the hydrogen yield may vary from 0 to 4 moles of hydrogen per mole of methane. These lower and higher yields correspond to the exothermic (−191.4 kcal/mole) and endothermic (+45.6 kcal/mole) reactions of Equations 5 and 1, respectively. The maximum possible yield of hydrogen at thermoneutral conditions can be estimated in an analogous manner for most other hydrocarbons using published thermodynamic data. For example, propane will produce up to 7.95 moles of hydrogen per mole of propane consumed at a 500° C. reaction temperature (see Example 9).

A comparison of the actual hydrogen yield with the theoretical yield then provides a measure of the extent to which the hydrogen synthesis reaction deviates from thermoneutrality. Thus the actual measured ratio of moles of hydrogen produced per mole of hydrocarbon feed provides a convenient indication of the approach of the hydrogen generating process to thermoneutrality. It is desirable that the yield of hydrogen be within ±10% of the maximum yield of hydrogen that can be realized at thermoneutral conditions. More desirably, the yield of hydrogen in the process may be within ±5% and most desirably may be within ±2% of this maximum yield.

As an example, when the feed hydrocarbon gas is methane, the theoretical yield of hydrogen according to Equations 1 and 5 is 3.23 moles per mole of methane. Variations of ±10% from this theoretical yield will result in an endotherm of about 19 kcal/mole or an exotherm of −19 kcal/mole for the process. A ±5% variation in the theoretical yield will lead to a corresponding endotherm and exotherm of 9.5 kcal/mole and −9.6 kcal/mole, respectively. A ±2% variation in the theoretical yield will lead to a corresponding endotherm and exotherm of about 3.8 and −3.8 kcal/mole, respectively.

Equation 7 further describes that the theoretical amount of steam required is 1.23 moles per mole of methane used. An embodiment of the present invention utilizes a process wherein less steam is required than in conventional steam-methane reforming, and therefore significant energy savings can be realized. In conventional steam-methane reforming, methane and steam are first converted to CO, $H_2$ and $CO_2$, which are subsequently converted in a separate shift reactor to a mixture of $H_2$ and $CO_2$. Excess steam is needed to maintain the catalyst activity in this shift conversion reactor. Because the methane-steam mixture is converted directly into $H_2$ and $CO_2$ in the present process without the need for a subsequent shift conversion step, excess steam is not required. In one embodiment of the present invention, the amount of steam used in the reaction is less than 150 percent of the theoretical amount required. For example, the amount of steam used in the reaction may be about 110 percent of the theoretical amount required.

In one embodiment of the present invention, the particular complex metal oxide to be used in the production of hydrogen gas may be selected to provide an autothermal and approximately thermoneutral process i.e., one where the yield of hydrogen is within 10% of the theoretical yield when the process is thermoneutral and possibly within 2% of this theoretical yield. Thus, the process of the present invention provides thermodynamic flexibility in the use of a selected complex metal oxide by providing for control of the balance of the enthalpy of reaction at selected reaction temperatures. Equation (4a), which describes the dissociation of the reduced complex metal oxide into two binary oxides, AO and $BO_{n-x-1}$, will generally be an endothermic reaction, while at about 700° C. the capture of carbon dioxide to form a metal carbonate as described in Equation 4b will generally be exothermic. The complex oxide dissociation thermochemistry provides for a greater flexibility in designing an autothermal and approximately thermoneutral hydrogen synthesis reaction step than would be possible with a binary oxide (e.g., AO) or a physical mixture of binary oxides.

Typically, the reactor is prepared for the present process by preparing a physical mixture of complex metal oxide and steam-hydrocarbon reforming catalyst and loading the mixture as a packed bed in the reactor. A source of steam is mixed in the desired proportion with methane, the mixture is fed into the reactor, and the product gases are removed from the reactor. The composition of the outlet gases in this synthesis step may be monitored by standard techniques such as in-line IR spectroscopy.

In the second step of the process the complex metal oxide is regenerated with air and the synthesis step is repeated. These two process steps can be integrated into a continuous cyclic process for generating hydrogen.

Completion of the synthesis step is indicated by an increase in the level of carbon dioxide or methane in the reactor effluent. The regeneration of the complex metal oxide is initiated by terminating the flow of hydrocarbon while continuing the flow of steam for a period of time sufficient to purge the reactor and reduce the concentration of combustible gases remaining in the reactor vessel to a safe level for the subsequent addition of air. The purge gas may be any inert gas such as steam, nitrogen, or mixtures thereof. Preferably, after terminating the hydrocarbon flow, the reactor is depressurized to a pressure below the reaction pressure, down to and including about atmospheric pressure, in a blowdown step.

Air is introduced into the purged reactor vessel to effect the regeneration of the complex metal oxide. The air may be externally preheated by passing through a heat exchanger or heated by direct firing from a fixed heater to the regeneration temperature. The regeneration of the complex metal oxide may take place spontaneously with a minimal input or loss of heat, and may occur at about the same temperature as the synthesis step, i.e., at a temperature in the range of about 450° C. to about 900° C. More specifically, the temperature may be in the range of about 600° C. to about 800° C. Typically, the regeneration of the complex metal oxide may be effected at a temperature up to about 150° C. above the temperature of the hydrogen production step. More specifically, the regeneration step may be effected at a temperature up to about 100° C. above the temperature of the hydrogen production step, and possibly at a temperature up to about 50° C. above the temperature of the hydrogen production step. The close correlation between the temperatures of the regeneration step and the production step that is possible in this process leads to improved catalyst stability and also reduces or eliminates the need for providing external heating during the reaction and regeneration steps.

For example, the reaction of methane and steam in the presence of a mixture of nickel oxide and calcium oxide (i.e., two binary oxides) yields hydrogen gas, calcium carbonate, and nickel metal. In the regeneration step, the thermal dissociation of calcium carbonate to form calcium oxide and carbon dioxide is a highly endothermic process. This highly endothermic process is rendered more favorable, at least in part, by the exothermic oxidation of nickel to nickel oxide. In addition, the nickel oxidation reaction is likely to proceed more rapidly than the decomposition of calcium carbonate, resulting in a rise in the temperature of the reaction bed and thus a greater degree of decomposition of calcium carbonate, since the decomposition reaction is equilibrium controlled. The temperature rise and accompanying elevated carbon dioxide production rate will necessarily be temporary, and will be followed by a decline in the rate of evolution of carbon dioxide. Sustained higher temperatures are therefore necessary for a complete conversion of calcium carbonate to calcium oxide. These results are discussed in U.S. Pat. No. 6,007,699. The elevated temperatures in the reaction vessel can create problems, such as, for example, the deactivation of the conventional steam-hydrocarbon reforming catalyst by sintering, and also requires an additional energy input.

In the present process, the decomposition of the carbonate $ACO_3$ by-product that is formed in the first step (Equation 7) is additionally driven by the formation of the ternary or higher complex metal oxide, from a spontaneous combination of binary or lower oxides (Equation 10) a step which is usually also exothermic (see, for example, L. A. Reznitskii, *Russian Journal of Physical Chemistry* 69 (8), p 1197 (1990) and L. A. Reznitskii, *Inorganic Materials* 32, No. 4, 1996, p 397-402). The exothermic reaction in part overcomes the thermally unfavorable endothermic decomposition of the metal carbonate, $ACO_3$.

Without being bound by theory, it is believed that in the second step of the process of the present invention (step (b)), wherein the complex metal oxide is regenerated, the metal carbonate $ACO_3$, which may be, for example, calcium carbonate, decomposes to yield carbon dioxide along with the formation of the generalized complex metal oxide $ABO_n$ and does not form a mixture of binary oxides. This reaction is the reverse of Equation 4 and is given by $$ACO_3 + BO_{n-x-1} + x/2 O_2 = CO_2 + ABO_n \qquad (8)$$

If the hydrogen synthesis step (Equation 7) comprises the reduction to the metallic state of at least one of the species of component B, then a first step in the regeneration of the generalized complex metal oxide $ABO_n$ is the formation of the oxide, described as $BO_{n-x-1}$ above by reaction of the metallic element B with oxygen. The regeneration step then proceeds as described in Equation 8.

It is believed that the reaction leading to the regeneration of the complex metal oxide as described in Equation 8 will be thermally less endothermic, and therefore closer to thermoneutral, and thermodynamically more spontaneous than the reaction leading to the production of physically mixed binary oxides, as described in Equation 9:

$$ACO_3 + BO_{n-x-1} + x/2 O_2 = CO_2 + AO + BO_{n-1} \qquad (9)$$

Equation 9 leads to the production of a physical mixture of oxides, not the single component, complex metal oxide. The additional driving force for the evolution of carbon dioxide from the spent oxide mixture, $ACO_3$ and $BO_{n-x-1}$, arises from the usually favorable formation of the complex metal oxide from its binary oxide components, as described by the reverse of Equation 4a, namely, $$BO_{n-1} + AO = ABO_n \qquad (10)$$

It is believed that the greater overall stability of the complex metal oxide arises from the usually larger coordination number of oxide ions around the A and B metal sites of the complex metal oxide compared to that of the precursor binary oxides $BO_{n-1}$ and AO. In addition, it is believed that because the formation of the complex metal oxide is usually a spontaneous process, the process will be accompanied by a negative free energy change. Therefore, the regeneration of the generalized complex metal oxide $ABO_n$ from the spent oxide mixture, $ACO_3$ and $BO_{n-x-1}$, as described in Equation 8, will be more exothermic than the production of binary oxides described in Equation 9. In addition, due to the lower free energy change ($\Delta G$) of Equation 8, the reaction should liberate carbon dioxide at a lower temperature, and/or at a higher carbon dioxide dissociation pressure than would be associated with the process of Equation 9. Thus, the release of carbon dioxide with a regeneration of the complex metal oxide in embodiments of the present invention (Equation 8) can be effected at conditions which more closely approach thermoneutrality and also at lower temperatures than conventional systems.

The above discussed theory that describes the underlying chemistry of the present process for generating hydrogen utilizing a complex metal oxide and the regeneration of the oxide, as formulated by Equations 1 to 7 above, can be used as a guide for choosing a process-appropriate complex metal oxide composition. The requirement that metallic element A be capable of forming a metal carbonate is implied by Equation 4b. The metal carbonate is formed in the hydrogen-generating reaction of Equation 7 and reacts with air during the complex metal oxide regeneration step by the reverse of Equation 4, namely, $$ACO_3 + BO_{n-x-1} + x/2 O_2 = ABO_n + CO_2 \qquad (8)$$

thus liberating carbon dioxide. This implies the need for a degree of reversibility in the formation of the metal carbonate at the process temperatures. Thus an initial consideration for choosing the metallic element A is the reversibility of reaction 4b, which may be expressed without being bound by this particular condition as the temperature at which the equilibrium carbon dioxide pressure $P(CO_2)$ is 1 atmosphere over the metal carbonate and metal oxide alone. As an illustration, the temperature and the reaction enthalpy ($\Delta H$) are provided in Table 1 for metal carbonates of some representative "A" elements from Groups 1 and 2.

TABLE 1

Reaction Enthalpies for Metal Carbonates

| Reaction | ΔH (kcal/mole) | T (° C.) for P($CO_2$) of 1 atm |
|---|---|---|
| $Li_2O + CO_2 \leftrightarrow Li_2CO_3$ | −42.7 | 1606 |
| $MgO + CO_2 \leftrightarrow MgCO_3$ | −23.6 | 304 |
| $CaO + CO_2 \leftrightarrow CaCO_3$ | −39.6 | 886 |
| $SrO + CO_2 \leftrightarrow SrCO_3$ | −48.3 | 1222 |

Lanthanum oxide, $La_2O_3$ can react with carbon dioxide to form intermediate lanthanum oxide-carbonates eg. $La_2O_{(1.8-2.4)}(CO_3)_{1.2-0.6}$ which according to V. D. Savin et al (Russ. Journal of Physical Chem. 62 (5) 598, 1988) is stable between 430° C. to 760° C.

The choice of an optimum A element, i.e., one that in terms of $CO_2$ reversibility and reaction enthalpy fulfills the requirement of both the reaction and regeneration steps of the process, i.e., Equation 7 and the reverse of Equation 4, additionally depends on the enthalpy and the reversibility (related to the Gibbs free energy change, ΔG) of the formation of the complex metal oxide from its binary oxide precursors (Equation 10). An exothermic (ΔH of <0) and favorable (ΔG of <0) formation of the complex oxide here will therefore tend to facilitate the release of carbon dioxide from the $ACO_3$ metal carbonate via Equation 8 enabling it to take place at lower temperatures, i.e., closer to the temperature of the synthesis step. L. A. Reznitskii in *Neorganisheskie Materialy* (*Inorganic Materials*) Vol. 29, No. 3, pp 386-389, "Enthalpic Stabilization of Some Complex Oxides", and also L. A. Reznitskii in *Inorganic Materials*, Vol. 32, No. 4, 1966, pp 444-451 "Enthalpic Stabilization of Some Perovskite-like Oxides", and related publications by this author, provide a method for estimating the enthalpy of formation $ΔH_f$ of complex oxides from simple (i.e. binary) oxides of the B metallic elements of the formula $A_xB_yO_n$. Examples 4, 5 and 6 below provide a quantitative illustration of the above methodologies and factors to consider in selecting the A and B metallic elements of complex metal oxides of this invention.

The regenerated complex metal oxide typically has very similar activity to the original complex metal oxide. With repeated cycling, however, the regenerated complex metal oxide may present slightly different physical characteristics from the original complex metal oxide. For example, the regenerated complex metal oxide may have a slightly lower particle size distribution. Nevertheless, the regenerated complex metal oxide is sufficient for use in the process and can be repeatedly recycled.

In one embodiment of the process of the present invention, each of the two steps of the process, i.e., hydrogen production and regeneration, are autothermal. Preferably, to achieve maximum energy efficiency, each of the two steps of the process should approach thermoneutrality as indicated by the yield of hydrogen in the first step of the process as discussed above. This "thermal control" can be achieved by varying the composition of the complex metal oxide and the quantity of any added nickel oxide in systems in which it forms a separate phase from the complex oxide.

While the overall process of the embodiments of the present invention can be described in terms two cyclic steps, the process may involve a plurality of steps. Thus, a plurality of parallel reaction vessels containing reaction beds of complex metal oxide and steam-hydrocarbon reforming catalyst may be utilized, and the reaction vessels may be operated in a cyclic manner. For example, one or more reaction vessels may be operated in the hydrogen production step while simultaneously one or more other reaction vessels are operated in the regeneration step or are undergoing purging in preparation for the hydrogen production step.

Each reactor vessel may operate in the following exemplary sequence of steps.

(a) A production step in which a feed mixture of hydrocarbon and steam is introduced into the reaction bed at the appropriate temperature and pressure. The reactor bed may include preheat and post cool zones. The reaction bed contains a mixture of complex metal oxide and steam-hydrocarbon reforming catalyst. The feed mixture is reacted with the complex metal oxide and steam-hydrocarbon reforming catalyst in an autothermal reaction to yield hydrogen and carbon dioxide as the major products. The carbon dioxide reacts with and is retained by the complex metal oxide, and the reactor effluent contains a mixture of hydrogen, steam, carbon dioxide, carbon monoxide, and unreacted methane. The effluent mixture is at an elevated temperature and pressure. The reaction is carried out until the complex metal oxide in the bed is reduced, at which time the bed is saturated with captured carbon dioxide and depleted of oxygen. The production step may be characterized by a production temperature that is defined as the time-averaged temperature of the reactor effluent during the production step. The production step may be characterized by a production pressure defined as the time-averaged pressure of the reactor effluent stream.

(b) A purge step in which the saturated or spent bed is first purged with an inert gas. Suitable inert gases include, but are not limited to, steam, nitrogen, and mixtures thereof. When steam is used as the purge gas, the process effluent consists largely of steam and hydrogen, which can be recycled to the production step. The purge gas pressure is preferably close to atmospheric pressure; however, if the purge gas is steam, it can be at either low or high pressure, since high pressure steam is used as a component of the feed mixture for other beds in the production step. For purging at low pressure, the purge step is preceded by a pressure reduction or blowdown step. For purging at high pressure, the purge step precedes the depressurization step.

(c) A regeneration step in which the reaction bed is regenerated with elevated temperature oxygen-rich gas at ambient pressure. The bed must be sufficiently purged to allow the safe introduction of oxygen-rich gas. Suitable oxygen-rich gases include hot air. Alternatively, a large excess of air may be co-fired with fuel to generate an oxygen-rich flue gas mix in a direct-firing process. The regeneration step liberates carbon dioxide and recharges the bed with oxygen so that the bed is prepared to undergo the production step. The regeneration step may be characterized by a regeneration temperature that is defined as the time-averaged temperature of the reactor effluent during the regeneration step.

(d) A repressurization step in which the regenerated bed is pressurized to the reaction pressure. Repressurization may be effected by using, for example, the high pressure steam and hydrocarbon feed mixture. Alternatively, repressurization may be effected by a hot high pressure reactor effluent from another bed undergoing the reaction step. It can also be raw synthesis gas feeding the PSA (Pressure Swing Adsorption) system. Alternatively, the repressurization gas can be high pressure steam. Optionally, the repressurization step is preceded by a purge with inert gas such as steam or nitrogen.

When the feed is natural gas or a $C_2$ to $C_4$ heavier hydrocarbon, or when a low molar steam/carbon ratio feed stream is used, there is the possibility of some carbon deposition in the reactor. This would be a serious issue in conventional reforming but not in the present process, since in this process the carbon that is formed will undergo gasification via oxidation to CO and $CO_2$ in the subsequent air regeneration step.

Figure 1:
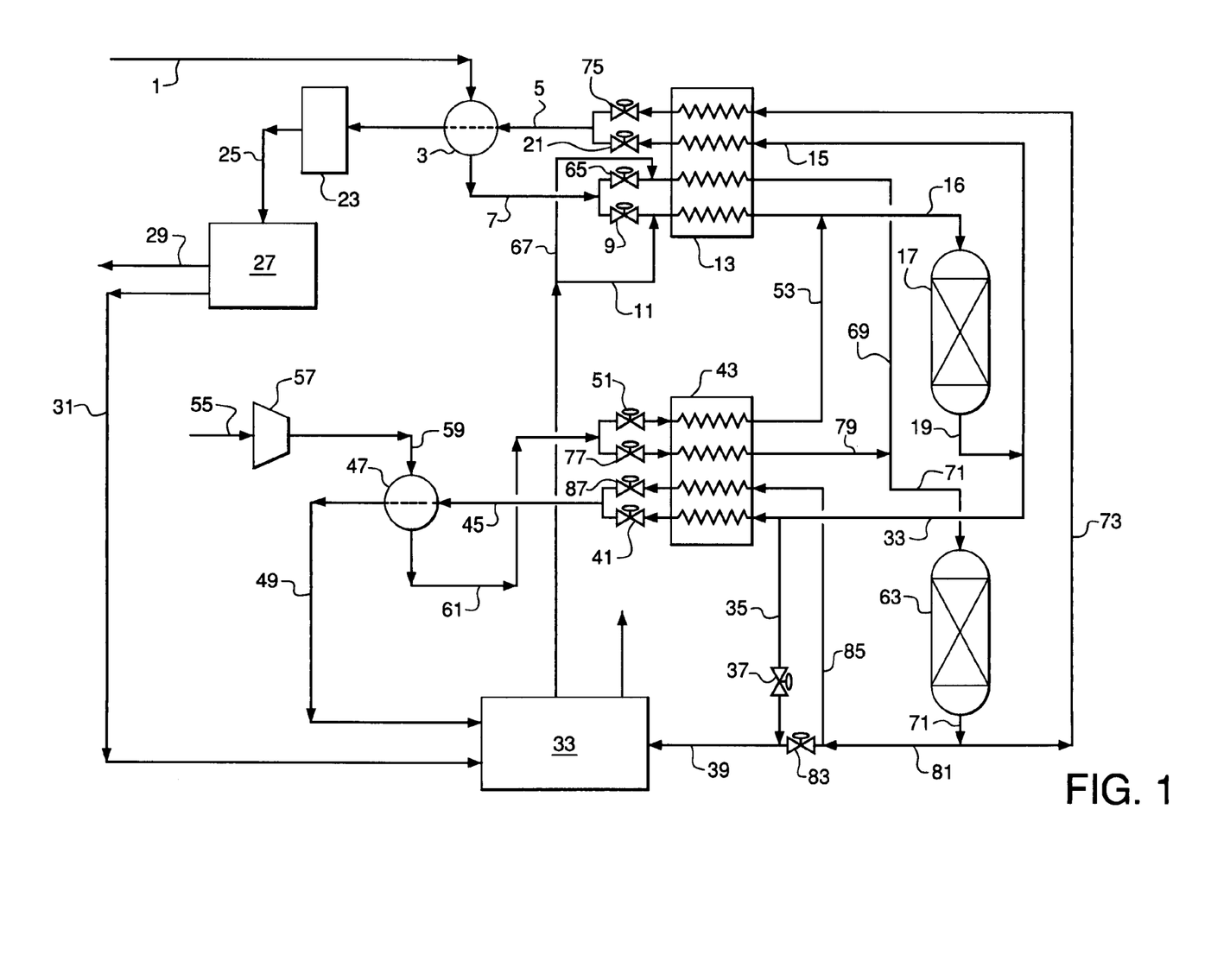
FIG. 1 is a schematic flow diagram of an exemplary process for the generation of hydrogen utilizing complex metal oxides in combination with steam-methane reforming catalyst.

The generation of hydrogen from hydrocarbons and steam according to an exemplary embodiment of the present invention is illustrated in the process flowsheet of FIG. 1. A hydrocarbon-containing feed gas, for example, methane provided by natural gas, optionally mixed with 1-15 mole % hydrogen, flows via line 1 at a pressure in the range of 100 to 600 psia to preheat exchanger 3 and is heated therein to a typical temperature in the range of about 200° C. to about 400° C. by heat exchange with a hot process stream (later defined) supplied via line 5. The feed may be desulfurized using metal promoted carbon (not shown) prior to line 1, or using ZnO after preheating prior to line 7 (not shown). The heated feed flows via line 7 and open valve 9 and is mixed with process steam provided via line 11 to form a hydrocarbon-steam feed mixture. Alternatively, steam may be added prior to valve 9 if desired (not shown). When the hydrocarbon is methane or natural gas, the molar ratio of steam to hydrocarbon may be from about 1:1 to about 4:1, and typically may be about 1.3:1 to about 2:1. The molar steam to hydrocarbon ratio may be higher, and may range up to about 20:1 for heavier hydrocarbons.

The steam-hydrocarbon mixture is introduced into heat exchange zone 13 and is further heated therein by heat exchange with a hot process stream (later defined). The heat exchange zone described here can be a recuperative or a conventional heat exchanger. Heat exchange can take place against any of the hot streams exiting the reactor. The steam-hydrocarbon mixture may be heated to a temperature in the range of about 350° C. to about 900° C., and typically may be in the range of about 600° C. to about 750° C. The heated mixture then is introduced via line 16 into reactor 17, which has a bed packed with a mixture of complex metal oxide material and a steam-hydrocarbon reforming catalyst. Alternatively, the heat exchange zone can be a portion of the reactor itself, at either or both of its ends, and lines may not be necessary. The reactor 17 itself is substantially adiabatic, and is insulated, preferably by an internal lining of refractory material(s). The feed mixture reacts in the bed to form primarily hydrogen and carbon dioxide, and, in much smaller amounts, carbon monoxide. The carbon dioxide is substantially retained by reaction with the complex metal oxide in the bed.

The inventory of chemically bound oxygen available for reaction, i.e., the oxygen associated with the complex metal oxide and steam reactants, may be adjusted in the reactor design so that the reaction product effluent stream leaves reactor 17 via line 19 at a time-averaged temperature between about 400° C. and about 750° C. The reaction product effluent stream flows via heat exchange zone 13, where it is cooled to a temperature in the range of about 250° C. to about 500° C. by heat exchange with incoming reactants as earlier described, or regenerant as described below. The cooled reaction product effluent stream exits heat exchange zone 13 via open valve 21 and is further cooled in heat exchange zone 3 and optionally boiler 23 to yield a further cooled reaction product effluent stream in line 25 at a typical temperature of 40° C. Any condensate is knocked out at this point (not shown).

The cooled reaction product stream is introduced into pressure swing adsorption (PSA) system 27 and is separated therein to yield a high-purity hydrogen product containing at least 99 vol % hydrogen that is withdrawn via line 29. Components removed from the hydrogen by the PSA system typically include carbon dioxide, water, methane and carbon monoxide, and these are withdrawn in a waste gas via line 31 during the blowdown and purge steps typically used in PSA process cycles. Any PSA cycle and system known in the art may be used in the process described in this and other embodiments of the invention. The waste gas in line 31 typically contains combustible components and may be used as fuel in a fired boiler, 33, or in a direct fired heater to preheat regenerant air (not shown).

The mixture of complex metal oxide material and steam-hydrocarbon reforming catalyst in reactor 17 has a finite inventory of chemically bound oxygen and a finite reaction capacity for carbon dioxide. Once either of these is exhausted, the purity and yield of hydrogen in the reaction product effluent stream leaving reactor 17 via line 19 will begin to decrease. The time at which this occurs can be determined by real-time analysis of the stream by any known analytical means, such as, for example, in-line IR spectroscopy. At this point, reactor 17 is switched to regeneration mode by closing valve 9 and depressurizing the reactor via lines 19, line 33, open valve 37, and line 39, wherein the hydrocarbon-containing blowdown gas is introduced into boiler 33 or a direct fired air heater (not shown). At this point, valve 41 remains closed. The blowdown can be cocurrent or countercurrent.

Valve 37 is then closed, Valve 41 is then opened and reactor 17 is purged with a suitable purge gas such as steam or nitrogen to remove residual hydrocarbons from the reactor void volume. In this embodiment, steam for purge is provided via line 11 and flows through heat exchanger 13 and line 16 into the reactor. Purge effluent gas leaves the reactor via lines 19 and 33, flows through heat exchanger 43, valve 41, line 45, heat exchanger 47, and line 49 into boiler 33. The purge can be cocurrent or countercurrent.

A particular feature of this embodiment is that the switching valves such as valve 9 or 51 are on the cooler side of the heat exchange zones 13 or 43. While this requires each reactor to be associated with its individual heat exchange zone, it does ease the mechanical requirements and operating life of the switching valves. It is possible to fuse heat exchange zones 13 and 43 into a single heat exchanger (not shown here), but that would require the valves to be repositioned to the hotter side of the heat exchange zone.

FIG. 1 shows the heat exchange zones to be of the conventional type where heat exchange between streams is contemporaneous. The heat exchange zones could also be recuperative in nature (not shown), where heat from a cooling stream is stored in the heat capacitance of the zone, and released to a warming stream in a subsequent step. The zones would comprise of inert solids such as ceramic pellets or firebrick. They could be located in a separate vessel, or form a portion of the reactor vessel itself at either or both ends, adjacent to the reaction zone which is the active zone filled with mixed metal oxide and reforming catalyst.

Regeneration of reactor 17 then is initiated by opening previously-closed valve 51. Air is provided via intake line 55 to compressor 57 and is compressed therein to about 15 to 100 psia and the compressed air inline 59 is preheated in heat exchanger 47 to about 250° C. to about 500° C., and introduced via line 61 and valve 51 into the heat exchange zone 43. The air is further heated in heat exchange zone 43 against hot exhaust gas from line 33 (later described), or hot reactor effluent as described earlier, to a temperature between about 500° C. and about 900° C., typically from about 700° C. to about 800° C. The heated air flows via lines 53 and 16 into reactor 17, and the oxygen in the air regenerates the complex metal oxide material by oxidizing the reduced (spent) metal oxide and releasing the carbon dioxide previously reacted with the complex metal oxide material. The carbon dioxide-rich, oxygen-depleted regeneration offgas leaves the reactor via line 33 at a temperature in the range of about 600° C. to about 900° C. and typically from about 650° C. to about 750° C. The hot regeneration offgas in line 33 is introduced into heat exchange zone 43 (this may be integrated with heat exchange zone 13) to heat the air entering via valve 51 as earlier described, or to heat the hydrocarbon-steam feed mixture as earlier described, whereby the offgas is cooled to a temperature in the range of about 350° C. to about 600° C. The cooled regeneration offgas flows via valve 41 and is further cooled to a temperature in the range of about 200° C. to about 300° C. in heat exchanger 47, thereby heating compressed air stream 59 as earlier described. The cooled regeneration offgas stream in line 49 still contains some residual oxygen, and may be introduces into boiler 33 for additional heat recovery.

Following the substantial regeneration of reactor 17 by removal of most or all of the carbon dioxide retained therein during the reaction step, the reactor may be purged with an inert gas and repressurized with steam, feed gas, or product gas. Following repressurization, the reactor proceeds to the reaction step and the cycle is repeated as described earlier.

Reactor 63 is operated through the same cycle steps described above for reactor 17, but the cycle of reactor 63 is staggered so that it operates in the regeneration mode when reactor 17 operates in the reaction or hydrogen production mode. Hydrocarbon-containing feed gas flows via valve 65, steam is added via line 67, the feed-steam mixture is heated in heat exchanger 13, and the heated feed flows via lines 69 and 71 to reactor 63. Reaction product gas leaves the reactor via lines 71 and 73, is cooled in heat exchanger 13, and flows via valve 75, line 5, heat exchanger 3, boiler 23, and line 25 to PSA system 27. Regeneration air is provided to reactor 63 via valve 77, heat exchanger 43, and line 71, and blowdown or depressurization gas exits via line 81, valve 83, and line 39 into boiler 33. Regeneration offgas leaves reactor 63 via line 85, heat exchanger 43, and valve 87, and then flows via line 45, heat exchanger 47, and line 49 to boiler 33.

Reactors 17 and 63 thus are operated in a staggered sequence between the hydrogen production and regeneration modes by the proper operation of switch valves 9, 21, 37, 41, 51, 65, 75, 77, 83, and 87 as described above. Operation with two parallel reactors with constant hydrogen product flow is possible when the elapsed time of the hydrogen production mode is equal to or greater than that of the regeneration mode. However, any suitable number of reactors in parallel may be used in staggered operation to achieve continuous hydrogen production. In practice, the duration of the hydrogen production step using a particular complex metal oxide may be different than the duration of the regeneration step. For example, if the regeneration step is twice as long as the production step, a configuration employing three parallel beds may be advantageously used wherein two beds are being regenerated while the third bed is used for hydrogen production.

The following Examples illustrate embodiments of the present invention but do not limit the invention to any of the specific details described therein.

EXAMPLE 1

Figure 2:
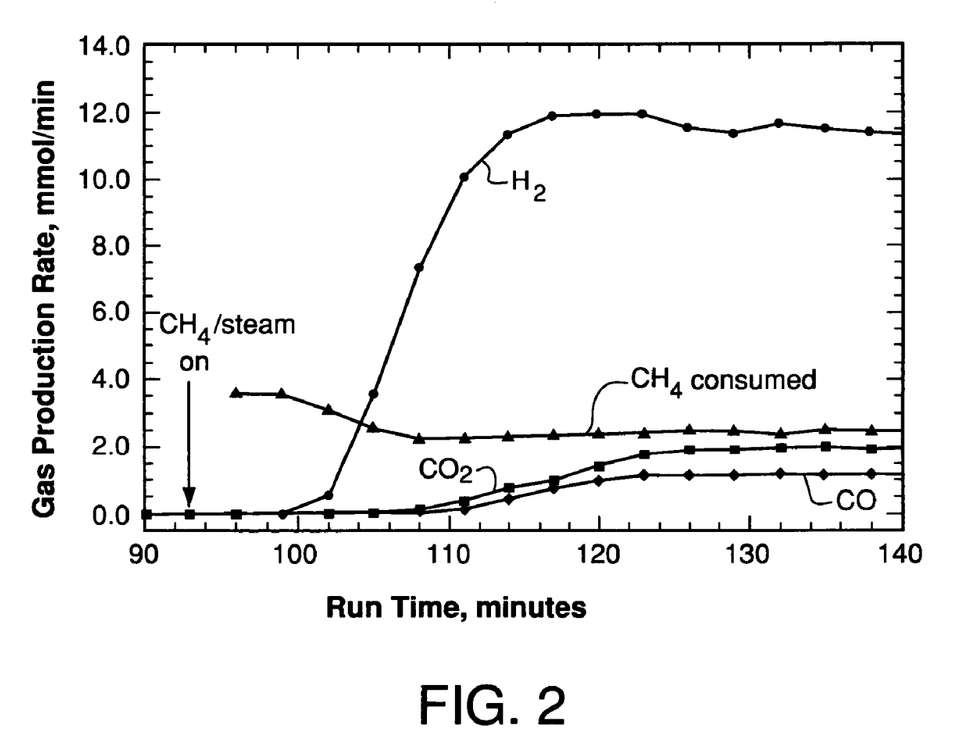
FIG. 2 is a plot of gas production and methane consumption vs. run time for Example 1.

Reaction of Methane and Steam in the Presence of $Sr_2Ni_2O_5$ Complex Metal Oxide and Reduced $NiO/Al_2O_3$ Steam-Methane Reforming Catalyst A commercially available steam-methane reforming catalyst consisting of about 50 wt. % nickel oxide on alumina was used in conjunction with $Sr_2Ni_2O_5$. To ensure optimal steam-methane reforming catalyst activity, the nickel oxide/alumina catalyst was reduced to metallic nickel before use. A physical mixture of $Sr_2Ni_2O_5$ and 9.90 wt % nickel oxide/alumina catalyst was heated to 700° C. and exposed to a dilute hydrogen flow (10 sccm hydrogen and 160 sccm argon) for about 5 minutes. The exposure time was calculated to yield a 60% reduction of nickel oxide to nickel, and presumed that reduction of $Sr_2Ni_2O_5$ does not occur. The resulting mixture was exposed to a mixture of methane/steam (80/240 sccm) for 6 hours at 700° C. As shown in FIG. 2, more hydrogen was produced than would be expected based on the quantity of carbon dioxide detected during the first 0.5 hour. Between run time 100 to 110 min, hydrogen was produced with virtually no carbon dioxide or carbon monoxide. This result is consistent with capture by the complex metal oxide of the carbon dioxide generated by steam-methane reforming and/or methane oxidation. Subsequently, the hydrogen to carbon dioxide ratio became constant around 6.4, with 4.4 moles of hydrogen per mole of methane. The internal temperature of the reactor increased rapidly upon exposure to steam/methane followed by a rapid return to a steady state value lower than that prior to methane/steam exposure. The above observations are consistent with (1) an initial period in which methane oxidation, steam-methane reforming, and carbon dioxide capture occur simultaneously followed by (2) a steady-state period in which mostly steam-methane reforming occurs.

EXAMPLE 2

Reaction of $LaNiO_3$ with Methane/Steam

Figure 3:
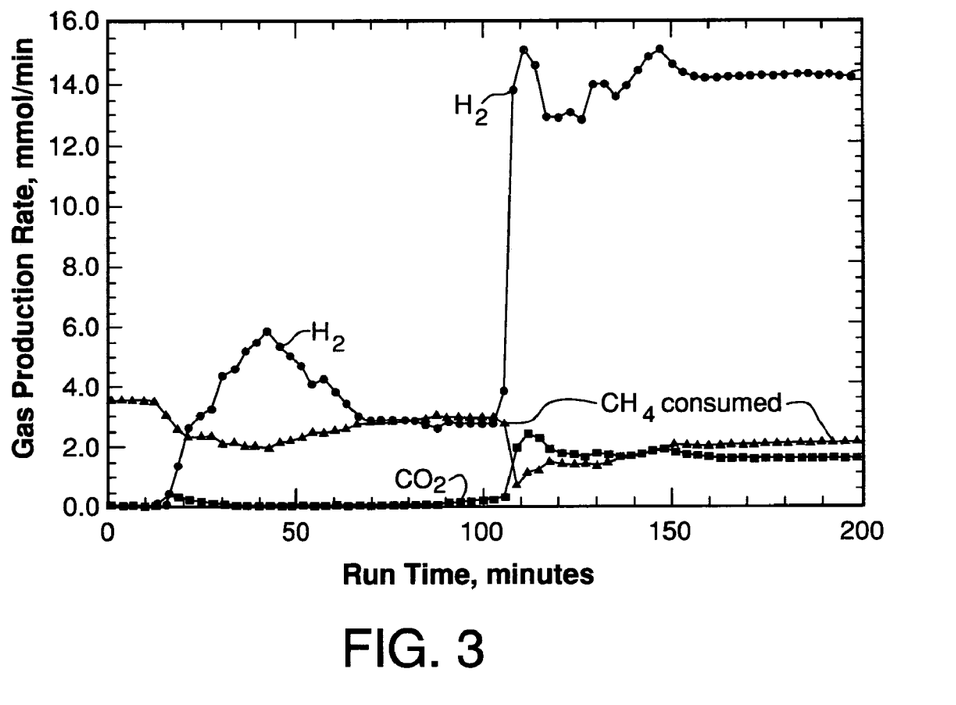
FIG. 3 is a plot of gas production and methane consumption vs. run time for Example 2.

The ternary oxide $LaNiO_3$ was heated to 700° C. and was exposed to a feed consisting of methane/steam in argon. The reactant feed was generated by blending 80 sccm methane, 240 sccm steam, and 80 sccm argon. As illustrated in FIG. 3, through the first 100 minutes, hydrogen was the predominant product along with relatively minor amounts of carbon dioxide and carbon monoxide (the carbon monoxide production was so low that it is not shown in FIG. 3). During this portion of the run, 315 mmol of hydrogen were produced. If all of this hydrogen arose from steam-methane reforming, the calculated carbon dioxide production would be 79 mmol. However, only 9.88 mmol of carbon dioxide was observed. It is believed that the remainder, 69.12 mmol or 1.8 moles of carbon dioxide per mole of $LaNiO_3$, was captured as a carbonate by the complex metal oxide. This demonstrates that the reaction of a ternary oxide with methane/steam can lead to production of hydrogen which is largely free of carbon dioxide and carbon monoxide. Once the carbon dioxide capture capacity of the ternary oxide was exceeded after about 105 minutes as shown in FIG. 3, conventional steam-methane reforming occurred with production of carbon dioxide along with hydrogen.

EXAMPLE 3

The complex metal oxide $SrCo_{0.4}Fe_{0.4}Cu_{0.2}O_{3.8}$ was exposed to a feed of 80 sccm methane, 125 sccm steam and 80 sccm argon as an optional diluent at 700° C. The product analysis after 0.3 hours on stream was as follows: 4.10% hydrogen; hydrogen/$CO_2$ ratio=5; and hydrogen/CO ratio was very large (essentially no carbon monoxide was produced).

By comparison, after a 1 hour exposure of the same oxide to a 1:1 methane: argon only feed at 700° C. yielded 15.0% hydrogen. Much less carbon dioxide and carbon monoxide was produced: hydrogen/$CO_2$=2140 and hydrogen/CO=8.5.

This demonstrates that steam is necessary in the reactant feed. Without the presence of steam, hydrogen is produced, but it is produced largely from the dissociation of methane to hydrogen and carbon.

EXAMPLE 4

As a specific example of Equation 8, the thermodynamics of various steps in the reaction of a mixture of iron(II) oxide, calcium carbonate, and oxygen to form the complex metal oxide $Ca_2Fe_2O_5$ (for which the requisite thermodynamic data is available) and carbon dioxide were calculated. The results are given in Table 2.

TABLE 2

Reaction Thermodynamics for Example 4

| Eqn. No. | Reaction | ΔH at 700° C. (Kcal/mole) | ΔG at 700° C. Kcal/mole |
|---|---|---|---|
| 11 | $2CaO + Fe_2O_3 = Ca_2Fe_2O_5$ | −9.79* | −13.8* |
| 12 | $2FeO + \frac{1}{2}O_2 = Fe_2O_3$ | −66.68 | −39.54 |
| 13 | $2CaCO_3 = 2CaO + 2CO_2$ | 81.48 | 13.29 |
| Net14 | $2CaCO_3 + 2FeO + \frac{1}{2}O_2 = Ca_2Fe_2O_5 + 2CO_2$ | 5.01 | −40.05 |

*Data for $Ca_2Fe_2O_5$ from L. A. Reznitskii, Russ J. Phys Chem'64 (8) 1990 p 1997–1999 and M. C. Dufour, P. Peurot, Rev. .Chem. Miner. 6 (2) 1969, p 42

The above sequence involves a highly exothermic (ΔH=−66.68 kcal/mole) and also highly spontaneous (ΔG=−39.54) oxidation of FeO to $Fe_2O_3$ (Reaction 12). Since in the process of the present invention all the solid components are in good thermal contact in the same bed, the heat from the oxidation of FeO together with the exothermic formation of the complex metal oxide $Ca_2Fe_2O_5$ (ΔH=−9.79) in Reaction 11 provide a net (endothermic) heat for Reaction 14 of 5.01/2 or 2.5 kcal/mole $CaCO_3$. This compares to a more endothermic and thus less favorable heat of 7.4 kcal/mole $CaCO_3$ for the combination of Reactions 12 and 13 alone, i.e. if there were no formation of the complex metal oxide.

Reactions 11 and 13 taken together may be viewed as one system in equilibrium for essentially the liberation of $CO_2$ from calcium carbonate:

$$2CaCO_3 + Fe_2O_3 \rightleftharpoons Ca_2Fe_2O_5 + 2CO_2 \quad (15)$$

for which from the data tabulated above ΔG=−0.51 kcal/2 moles $CaCO_3$ in contrast to ΔG=13.29 kcal/2 moles $CaCO_3$ for $CaCO_3$ decomposition to just CaO and $CO_2$ (Reaction 13). Since $$\Delta G = -RT \ln K \text{ where } K=1/\text{Pressure } CO_2 \quad (16)$$

it is clear that reaction 15, with its much lower and negative free energy charge, will favorably proceed at lower temperatures and/or with higher $CO_2$ decomposition pressures than Reaction 13. In essence, the liberation of $CO_2$ from $CaCO_3$ is greatly facilitated, but the by-product now is the complex metal oxide, $Ca_2Fe_2O_5$, rather than the binary oxide, CaO.

EXAMPLE 5

The calculation of Example 4 was repeated for the reaction of the same reactants to yield $CaFe_2O_4$ and the results are given in Table 3.

TABLE 3

Reaction Thermodynamics for Example 5

| Eqn. No. | Reaction | ΔH at 700° C. (Kcal/mole) | ΔG at 700° C. (Kcal/mole) |
|---|---|---|---|
| 15 | $CaO + Fe_2O_3 = CaFe_2O_4$ | −8.06 | −8.33 |
| 12 | $2FeO + \frac{1}{2}O_2 = Fe_2O_3$ | −66.68 | −39.54 |
| 16 | $CaCO_3 = CaO + CO_2$ | 40.74 | 6.64 |
| Net 17 | $CaCO_3 + 2FeO + \frac{1}{2}O_2 = CaFe_2O_4 + CO_2$ | −34.00 | −41.22 |

This system is more exothermic and thus less desirable from a process point of view, but it serves to again illustrate the thermodynamic advantage of utilizing the exothermic and spontaneous formation of a complex oxide from binary oxides. The free energy change for the combination of reactions 15 and 16, i.e., the $Fe_2O_3$ assisted liberation of $CO_2$ from $CaCO_3$ is ΔG=−1.69 kcal/mole $CaCO_3$ as compared to a ΔG of 6.64 kcal/mole for $CaCO_3$ dissociation to CaO (a binary oxide) and $CO_2$ (Reaction 16). Thus the former reaction where a complex oxide is the by-product is greatly favored for a release of carbon dioxide from $CaCO_3$.

EXAMPLE 6

At a temperature below about 1700° C., lithium carbonate does not spontaneously decompose to produce carbon dioxide and lithium oxide. Yet in this Example as shown in Table 4 below, such a reaction is thermodynamically possible (ΔG <<0) if the product is the complex metal oxide, lithium chromate, $Li_2CrO_4$.

TABLE 4

Reaction Thermodynamics for Example 6

| Eqn. No. | Reaction | ΔH at 700° C. (Kcal/mole) | ΔG at 700° C. (Kcal/mole) |
|---|---|---|---|
| 18 | $2Li_2CO_3 = 2CO_2 + 2Li_2O$ | 98.60 (84.6*) | 36.14 (−2.12*) |
| 19 | $2Li_2O + 2CrO_3 = 2Li_2CrO_4$ | −90.34 | −118.96 |
| 20 | $Cr_2O_3 + 1.5O_2 = 2CrO_3$ | 8.748 | 42.510 |
| Net 21 | $Cr_2O_3 + 1.5O_2 + 2Li_2CO_3 = 2Li_2CrO_4 + 2CO_2$ | 17.01 | −40.3 |

*at 1700° C.

EXAMPLE 7

The enthalpy and free energy changes for the process of Step 1, the generation of $H_2$ from $CH_4$ utilizing $Ca_2Fe_2O_5$ as the mixed metal oxide, were calculated and are illustrated in Table 5.

TABLE 5

Reaction Thermodynamics for Example 7

| Eqn. No. | Reaction | ΔH at 700° C. (Kcal/mole) | ΔG at 700° C. (Kcal/mole) |
|---|---|---|---|
| 22 | $Ca_2Fe_2O_5 = Fe_2O_3 + 2CaO$ | 9.79 | 13.8 |
| 23 | $Fe_2O_3 = 2FeO + \frac{1}{2}O_2$ | 66.68 | 39.54 |
| 24 | $\frac{1}{2}O_2 + 2CH_4 + 3H_2O(g) = 2CO_2 + 7H_2$ | 31.91 | −58.04 |
| 25 | $2CaO + 2CO_2 = 2CaCO_3$ | −81.48 | −13.29 |
| Net 26 | $Ca_2Fe_2O_5 + 2CH_4 + 3H_2O = 2FeO + 2CaCO_3 + 7H_2$ | 26.9 | −18.0 |

The component reactions here are: a dissociation of $Ca_2Fe_2O_5$ into its component binary oxides (Equation 22) (an illustration of the chemistry of Equation 4a), reduction of $Fe_2O_3$ to FeO and oxygen (Equation 23) (an illustration of the chemistry of Equation 2), steam-methane reforming combined with partial oxidation with $O_2$ (equation 24) (an illustration of the chemistry of Equation 6) and the sequestration of $CO_2$ with calcium oxide (Equation 25) (an illustration of reaction 4b).

The total synthesis reaction (Equation 26) though endothermic and thus requiring an input for heat for sustained operation is still spontaneous (ΔG<<0) and with an effective steam-methane reforming catalyst it should proceed to completion, with a total conversion of methane. This analysis is useful for designing a thermoneutral system which here clearly requires a $CaBO_n$ complex metal oxide where B is an element, or a combination of two or more elements, potentially in various oxidation states for which the binary oxide, $BO_{n-1}$ is more easily reduced, i.e., where ΔH for the equivalent of Equation 23 is lower (ideally here by 26.9 kcal/mole $CH_4$.)

EXAMPLE 8

Figure 4:
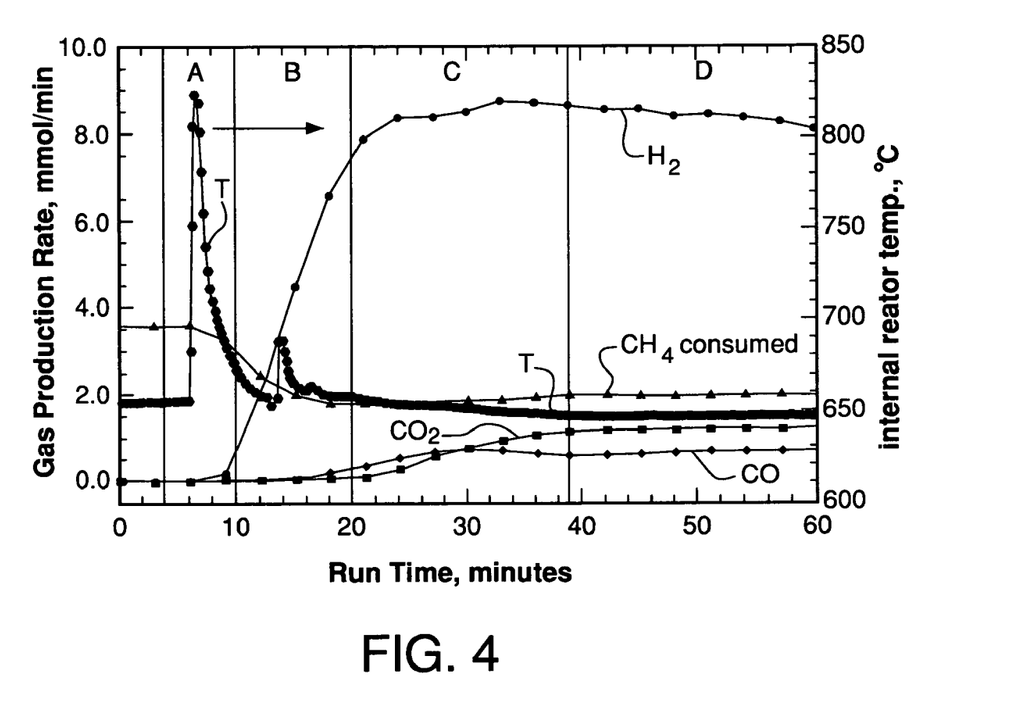
FIG. 4 is a plot of gas production, methane consumption, and reactor temperature vs. run time for Example 8.

Reaction of Methane/Steam with $Sr_2Ni_2O_5$ in the Presence of a Steam-Methane Reforming Catalyst A physical mixture of $Sr_2Ni_2O_5$ and a 0.5% Pt on $ZrO_2$ steam-methane reforming catalyst was prepared. The mixture contained 14.8 wt % of the steam-methane reforming catalyst. The mixture was heated to 700° C. and exposed to feed gas containing 80 sccm methane blended with 240 sccm steam for 6 hours. FIG. 4 plots the rate of gas production (mmol/min) on the left vertical axis and internal reactor temperature as a function of run time on the right side vertical axis. The Figure can be divided into four regions A through D (increasing reaction times) corresponding to more or less distinct reaction regimes. In Region A, a large temperature increase occurs due to total combustion of methane. Neither hydrogen nor carbon dioxide was observed, with the carbon dioxide resulting from combustion being absorbed by the oxide. In Region B, almost no temperature change was observed and relatively pure hydrogen was produced. This region corresponds to the autothermal or thermoneutral production of hydrogen with only low levels of CO and gas phase $CO_2$ by-products (see Table 6, below). In region C, increasing concentrations of carbon dioxide and carbon monoxide were observed along with a steady state concentration of hydrogen and a decreasing reactor temperature. Region C corresponds to a shift from autothermal production of hydrogen to conventional steam-methane reforming. Finally in region D, production of hydrogen occurs by conventional steam-methane reforming alone. As expected for endothermic steam-methane reforming, the temperature of the reactor was lower than that prior to introduction of the methane/steam feed. These results demonstrate that in Region B autothermal reforming using $Sr_2NiO_{2.5}$/steam-methane reforming catalyst occurs. In the operation of the process, the methane/steam feed cycle would be stopped at the end of Region B and the oxide would be regenerated.

TABLE 6

Reaction of methane/steam with $Sr_2Ni_2O_5$ and $Pt/ZrO_2$ steam-methane reforming catalyst. Total gas production during the first 21 minutes of steam/methane exposure.

| total gas production, mmol | | | | ratios of total gas production | | |
|---|---|---|---|---|---|---|
| $H_2$ | CO | $CO_2$ | $CH_4$* | $H_2/CO_2$ | $H_2/CO$ | $H_2/CH_4$ |
| 51.0 | 1.05 | 0.54 | 57.8 | 94 | 49 | 0.88 |

*$CH_4$ consumed

Regeneration of Spent $Sr_2Ni_2O_5$

A sample of $Sr_2Ni_2O_5$ that had been exposed to five $CH_4$/steam feed cycles was regenerated by heating in air at 950° C. XRD analysis showed that the reoxidation product contained $SrNiO_3$, NiO, and $Ni_2O_3$ as the major phases along with minor amounts of $SrCO_3$ and possibly $Sr(OH)_2.xH_2O$ (most likely from reaction of SrO with humid air). This result shows that carbonate decomposition and reforming of a ternary oxide can with this mixed metal oxide be achieved at 950° C. For comparison, dissociation of $SrCO_3$ to SrO and $CO_2$ would require temperatures in excess of 1200° C., where ΔG would be <0.72 kcal/mole.

EXAMPLE 9

Theoretical Stoichiometric Calculation for Production of Hydrogen from Propane (a) Propane Oxidation:

$$C_3H_8 + 5O_2 \rightarrow 3CO_2 + 4H_2O \quad (27)$$

ΔH=−487.99 kcal/mole at 500° C.

(b) Propane Steam Reforming $$C_3H_8 + 6H_2O = 3CO_2 + 10H_2 \quad (28)$$

ΔH=100.17 kcal/mole at 500° C.

Scaling Equations 27 and 28 by their ΔH values at 500° C., yields Equation 29:

$$C_3H_8 + 3.95H_2O + 1.026O_2 \rightarrow 3CO_2 + 7.95H_2 \quad (29)$$

Equation 29 thus describes the overall thermoneutral process where ΔH=0.

The reaction of complex metal oxide $ABO_n$ with carbon dioxide is described as $$3ABO_n + 3CO_2 \rightarrow 3ACO_3 + 3BO_{n-x-1} + 3/2xO_2 \quad (30)$$

Therefore, combining Equations 3 and 4 (by using 3/2x $O_2$ (Equation 30)=1.026 $O_2$ (Equation 29)), yields Equation 31, the theoretical stoichiometry of the reaction of propane with complex metal oxide $ABO_n$ and steam to yield hydrogen in a thermoneutral process, i.e., where ΔH=0.

$$C_3H_8 + 3ABO_n + 3.947H_2O \rightarrow 3ACO_3 + 3BO_{n-0.684-1} + 7.95H_2 \quad (31)$$

Equation 31 describes that at 500° C., the maximum theoretical yield of hydrogen gas will be 7.95 moles of hydrogen per mole of propane used in the reaction; the minimum steam/hydrocarbon molar ratio here will be ~4:1.

The invention claimed is:

1. A process for producing hydrogen in a reactor comprising:

reacting at least one hydrocarbon and steam in the presence of a complex metal oxide and a steam-hydrocarbon reforming catalyst in a production step under reaction conditions sufficient to form hydrogen gas, a metal carbonate and a reduced metal oxide; and reacting the reduced metal oxide, the metal carbonate and an oxygen source gas in a regeneration step under reaction conditions sufficient to oxidize the metal oxide, release carbon dioxide, and regenerate the complex metal oxide, wherein the complex metal oxide is represented by the formula $A_xB_yO_n$ wherein A represents at least one metallic element having an oxidation state ranging from +1 to +3, inclusive, wherein the metallic element is capable of forming the metal carbonate; x is a number from 1 to 10, inclusive; B represents at least one metallic element having an oxidation state ranging from +1 to +7, inclusive; y is a number from 1 to 10, inclusive; and n represents a value such that the complex metal oxide is rendered electrically neutral.

2. The process of claim 1 further comprising purging the reactor with a purge gas to displace combustible components from the reactor and withdrawing a purge gas effluent therefrom prior to the regeneration step.

3. The process of claim 1 wherein A in the complex metal oxide represents at least one metallic element selected from the group consisting of elements of Groups 1, 2, and 3, and the Lanthanide elements of the IUPAC Periodic Table of the Elements; and B represents at least one metallic element selected from the group consisting of elements of Groups 4 to 15 of the IUPAC Periodic Table of the Elements.

4. The process of claim 1 wherein B in the complex metal oxide is selected from the group consisting of vanadium, chromium, manganese, iron, cobalt, copper, nickel, and mixtures thereof.

5. The process of claim 1 wherein the production step is characterized by a production temperature in the range of 350° C. to 900° C. and a production pressure ranging from 1 to 100 atmospheres.

6. The process of claim 1 wherein the molar ratio of steam to the at least one hydrocarbon ranges from 1:1 to 20:1.

7. The process of claim 1 wherein the molar ratio of steam to the at least one hydrocarbon in the feed gas during the production step is less than 150% of the theoretical amount.

8. The process of claim 2 wherein the regeneration step is characterized by a regeneration temperature in the range of 450° C. to 900° C.

9. The process of claim 2 wherein the production step is characterized by a production temperature and the regeneration step is characterized by a regeneration temperature, wherein the regeneration temperature is greater than the production temperature and wherein difference between the regeneration temperature and the production temperature is 100° C. or less.

10. The process of claim 1 wherein the steam-hydrocarbon reforming catalyst contains one or more components selected from the group consisting of nickel, cobalt, ruthenium, osmium, rhodium, palladium, platinum, iridium, and oxides of the foregoing metals, and a catalyst support.

11. The process of claim 1 wherein the at least one hydrocarbon is selected from the group consisting of aliphatic hydrocarbons having from 1 to 20 carbon atoms.

12. The process of claim 11 wherein the at least one hydrocarbon is methane obtained as a component of natural gas.

13. The process of claim 12 wherein the molar ratio of steam to methane ranges from 1.3:1 to 4:1, inclusive.

14. The process of claim 11 wherein the yield of hydrogen produced per mole of the at least one hydrocarbon consumed is within ±10% of the maximum yield of hydrogen that can be realized at thermoneutral conditions.

15. The process of claim 2 where the regeneration step is carried out at a pressure lower than the pressure of the production step.

16. A process for producing hydrogen comprising (a) providing a reactor containing a complex metal oxide and a steam-hydrocarbon reforming catalyst, wherein the complex metal oxide is represented by the formula:

$A_xB_yO_n$ wherein A represents at least one metallic element having an oxidation state ranging from +1 to +3, inclusive, wherein such metallic element is capable of forming a metal carbonate; x is a number from 1 to 10, inclusive; B represents at least one metallic element having an oxidation state ranging from +1 to +7, inclusive; y is a number from 1 to 10; inclusive and n represents a value such that the complex metal oxide is rendered electrically neutral;

(b) introducing a feed gas containing at least one hydrocarbon and steam into the reactor in a production step, reacting the at least one hydrocarbon and the steam in the presence of the complex metal oxide and the steam-hydrocarbon reforming catalyst under reaction conditions sufficient to form hydrogen, a metal carbonate and a reduced metal oxide, and withdrawing from the reactor a product gas comprising hydrogen;

(c) terminating the introduction of the at least one hydrocarbon and optionally purging the reactor with a purge gas to displace combustible components from the reactor and withdrawing a purge gas effluent therefrom;

(d) regenerating the reactor in a regeneration step by reacting the reduced metal oxide, the metal carbonate and an oxygen source gas under reaction conditions sufficient to regenerate the complex metal oxide;

(e) optionally purging the reactor with a purge gas;

(f) pressurizing the reactor by introducing a pressurizing gas into the reactor at pressure; and (g) repeating (b) through (f) in a cyclic manner.

17. The process of claim 16 wherein the pressurizing gas is obtained from the group consisting of hot reactor feed, hot reactor effluent, steam, feed to a pressure swing adsorption system, and product gas.

18. The process of claim 16 that further comprises, prior to purging the reactor in (c), depressurizing the reactor by withdrawing a depressurization gas therefrom.

19. The process of claim 16 wherein the feed gas contains up to 25 vol % hydrogen.

20. The process of claim 19 wherein the feed gas is prereformed natural gas.

21. The process of claim 16 that further comprises cooling the product gas and removing non-hydrogen components therefrom in a pressure swing adsorption process to yield a high-purity hydrogen product comprising at least 99 vol % hydrogen.

22. The process of claim 16 that further comprises providing at least one additional reactor containing the complex metal oxide and the steam-hydrocarbon reforming catalyst, and operating the at least one additional reactor by carrying out steps (b) through (f) such that each of the reactors proceeds through the production step (b) during a different time period.

23. The process of claim 16 wherein a portion of the product gas from the production step is retained and is introduced into the reactor with the feed gas in a succeeding production step.

24. The process of claim 16 wherein the purge gas is selected from the group consisting of steam, nitrogen, and a mixture thereof.

25. The process of claim 16 wherein the feed gas comprises methane and the yield of hydrogen produced per mole of methane consumed is within ±10% of the maximum yield of hydrogen that can be realized at thermoneutral conditions.

* * * * *